May 7, 1963    A. G. V. GUSTAFSSON ET AL    3,088,901
SAFETY ROD FOR LIQUID-COOLED, LIQUID-MODERATED NUCLEAR REACTOR
Filed Jan. 25, 1960
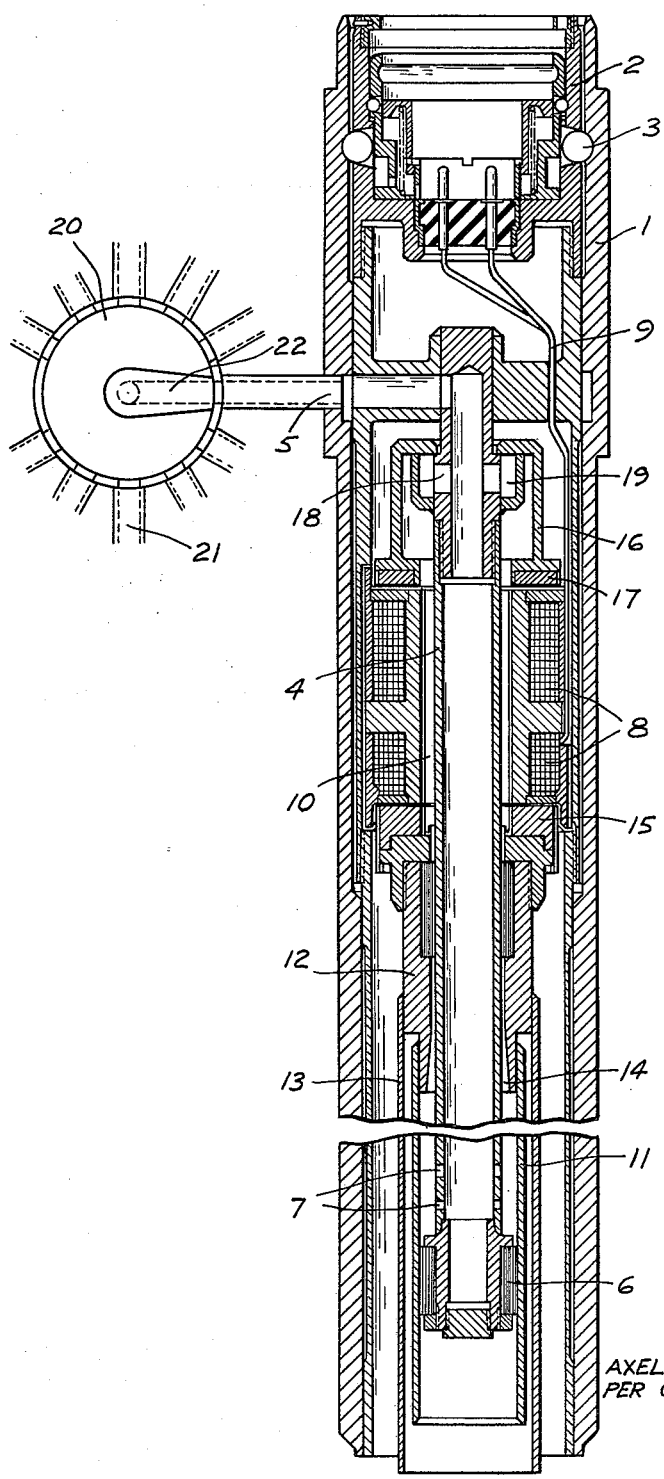
INVENTORS
AXEL GERHARD VÄRNE GUSTAFSSON
PER OLLE LENNART GUSTAFSSON
BY Hane and Nydick
ATTORNEYS

United States Patent Office 3,088,901
Patented May 7, 1963

3,088,901
SAFETY ROD FOR LIQUID-COOLED, LIQUID-MODERATED NUCLEAR REACTOR
Axel Gerhard Värne Gustafsson and Per Olle Lennart Gustafsson, Karlskoga, Sweden, assignors to Aktiebolaget Bofors, Bofors, Sweden, a Swedish company
Filed Jan. 25, 1960, Ser. No. 4,260
2 Claims. (Cl. 204—193.2)

The present invention relates to a safety rod for a liquid-cooled, liquid-moderated nuclear reactor.

Nuclear reactors are provided with safety rods, the purpose of which is, when required, to quickly insert an absorption rod in the reactors so that the neutron radiation from the fuel element is absorbed and the heat development in the reactor is reduced or ceases.

It is of importance that the safety rods function entirely satisfactorily.

The purpose of the present invention is to achieve a safety rod which is especially suitable for a liquid-cooled, liquid-moderated nuclear reactor and which comprises an absorption rod intended to take up two positions viz. entirely immersed in the reactor tank and entirely withdrawn from it.

This is achieved according to the invention in that the absorption rod is fixed to a cylinder which can slide on a fixed piston, which piston is arranged on a hollow piston rod, the internal part of which has its lower part connected with the inside of the cylinder, the cylinder, then in order to avoid displacement in relation to the piston being intended to be secured with the aid of an electromagnet which also serves the purpose of closing a valve which can open the connection between the inside of the piston rod and the reactor tank.

The invention will be described more in detail in the following specification with reference to the attached drawing which shows a vertical section of a safety rod designed according to the invention.

In the drawing, 1 designates an external tube, which can be welded to the cover of the reactor. In the tube 1 there is another tube 2 arranged so that it can be moved. This is normally secured against being displaced by a number of locking balls 3 in a locking device at the upper part of the tube. The locking device does not comprise any part of the present invention and will not be described in detail. In the tube 2 a hollow piston rod 4 is fixed, the internal part of which is connected with a transverse channel 5 which is connected with a controlable source for D$_2$O under pressure. At its lower end the piston rod 4 is provided with the piston 6 and with side apertures 7 immediately over the said piston. The upper part of the piston rod 4 is encircled by an electromagnet 8 fixed in the tube 2, which can be provided with current from conductors 9. Between the piston rod 4 and the electromagnet 8 there is a ring-shaped channel 10.

A piston cylinder 11 is arranged to slide on the piston 6 and is provided with a guide sleeve 12 which seals against the piston rod 4. On the said guide sleeve a ring-shaped absorption rod 13 is fixed. The guide sleeve 12 is provided with a tapered part 14 intended to function as a brake at the last part of the movement downwards of the cylinder 11 in relation to the piston rod 4. At its upper part the guide sleeve 12 is provided with an iron core 15 which can be secured by the electromagnet 8.

Over the magnet 8 an axially movable dome 16 is arranged which is provided with an iron core 17, intended to be held in place by the electromagnet 8. At its upper part the piston rod 4 is provided with side apertures 18 which lead to a chamber 19 which is closed by the dome 16.

The control rod described functions in the following way.

When switched on, the electromagnet 8 holds the absorption rod 13 lifted up and the chamber 19 closed.

When the rod is to be dropped down the circuit is broken and the rod falls of its own weight. The liquid inside the piston rod 4 passes through the channels 18 into the chamber 19 and lifts the dome 16, after which it flows downwards through the channel 10 to the annular space between external tube 1 and piston rod 4 and thence downwardly to the reactor tank in which absorption rod 13 has been immersed. During the falling movement the side apertures 7 achieve a certain brake effect due to the fact that the D$_2$O fluid trapped between the piston 6, the piston rod 4, the piston cylinder 11, and the guide sleeve 12 is being squeezed therethrough by virtue of the descent of the latter two, which brake effect is further amplified by the tapered part 14 during the last part of the movement.

When the rod is to be lifted again after having been dropped, the circuit of the magnet 8 is closed, and the chamber 19 is closed by the dome 16. A pressure higher than the pressure in the reactor tank is now introduced through the channel 5. D$_2$O is now pressed out from the inside of the piston rod 4 through the openings 7 and lifts the cylinder 11, and the guide sleeve 12 and the absorption rod 13 are brought along upwards. When the iron core 15 reaches the magnet 8 the absorption rod can be secured by the magnetic force alone.

It is not necessary that a complete seal is obtained between the piston rod 4 and the sealing sleeve 12 and between the rod 6 and the piston cylinder 11.

The pressure which is introduced through the channel 5 is controlled by a distribution device 20, the inside of which, through a channel 21, is kept at low pressure. A hollow distribution lever 20 is rotatably arranged in the distribution device and the inside of the lever 22 has a pressure lower than the pressure of the reactor tank. The distribution device is provided with several tubes which lead to apertures corresponding to the apertures 5 in other safety rods of the same design as the one shown in the drawing.

We claim:

1. A safety rod assembly for use in a liquid-moderated, liquid-cooled nuclear reactor wherein said assembly depends into the reactor tank, said assembly comprising support means for fixing said assembly relative to the top of said reactor and depending downwardly thereinto, a hollow piston rod having a closed bottom end depending from said fixed support, a coaxial cylinder of larger diameter slidably supported about said piston rod, said piston rod and said cylinder being spaced apart in slidable relation by an outwardly enlarged circumferential portion of the bottom of said piston rod and an inwardly enlarged circumferential portion of the top of said cylinder so as to form a closed chamber therebetween of adjustable volume, at least one aperture of relatively small diameter at the lower end of said piston rod communicating the interior thereof with said chamber, a pressurizing aperture at the upper end of said piston rod and communicating with the interior thereof, an absorption rod carried by said cylinder for movement therewith between an immersed position within said reactor tank and a withdrawn position, an electromagnet carried by said support means and adapted to hold said cylinder with said absorption rod in a withdrawn position against the pull of gravity when said electromagnet is energized, a valve at the upper end of said piston rod communicating the upper interior thereof with said reactor tank when said valve is open, said valve being closed by the energization of said electromagnet.

2. A safety rod assembly according to claim 1, wherein said valve further comprises at least one side aperture at the upper end of said piston rod above said electromagnet, an annular chamber surrounding said piston rod and affixed thereto and communicating with said side aperture therein, a dome member sitting atop said annular chamber and when in contact therewith forming the upper wall thereof, said dome member being movable upward relative to said annular chamber so as to open said chamber to communication with the space between said support means and said piston rod and thus downwardly to said reactor tank, ferromagnetic means depending downwardly to and resting upon said electromagnet when said dome member sits atop said annular chamber, said dome member being held atop said annular chamber so as to seal against pressure therein when said electromagnet is energized.

References Cited in the file of this patent

UNITED STATES PATENTS 2,688,313   Bauer _____ Sept. 7, 1954

OTHER REFERENCES

Schultz, Control of Nuclear Reactors and Power Plants, McGraw Hill (1955), pages 110–112.